(12) United States Patent
Berges

(10) Patent No.: US 6,347,803 B1
(45) Date of Patent: Feb. 19, 2002

(54) BICYCLE WITH TWO CHAIN DRIVEN DIFFERENTIALS

(76) Inventor: Oscar L. Berges, 4450 Murieta Cir., San Diego, CA (US) 92154

(*) Notice: Subject to any disclaimer, the term of this patent is extended or adjusted under 35 U.S.C. 154(b) by 0 days.

(21) Appl. No.: 09/544,180

(22) Filed: Apr. 6, 2000

(51) Int. Cl.[7] ............................................... B62M 1/02
(52) U.S. Cl. ........................ 280/260; 280/261; 475/336
(58) Field of Search ................................. 280/259, 260, 280/261, 284; 475/336

(56) References Cited

U.S. PATENT DOCUMENTS

| | | | | |
|---|---|---|---|---|
| 321,910 | A | * 7/1885 | Nye | 475/336 |
| 437,820 | A | * 10/1890 | Peck | 475/336 |
| 651,676 | A | * 6/1900 | Storey | 280/261 |
| 1,360,032 | A | 11/1920 | Schiffner | |
| 1,535,714 | A | 4/1925 | Burke | |
| 3,921,467 | A | 11/1975 | Matsuura | |
| 4,826,191 | A | 5/1989 | Matre et al. | |
| 5,102,155 | A | 4/1992 | Chou | |
| 5,577,749 | A | * 11/1996 | Ross | 280/261 |
| 5,873,590 | A | 2/1999 | Abe et al. | |
| 6,029,990 | A | * 2/2000 | Busby | 280/261 |

FOREIGN PATENT DOCUMENTS

| | | | |
|---|---|---|---|
| GB | 9845 | * of 1894 | 280/261 |
| GB | 2460 | * of 1895 | 280/261 |
| GB | 4847 | * of 1895 | 280/261 |
| GB | 14951 | * of 1895 | 475/336 |
| GB | 9427 | * of 1899 | 280/261 |

* cited by examiner

*Primary Examiner*—Daniel G. DePumpo
(74) *Attorney, Agent, or Firm*—Donn K. Harms

(57) ABSTRACT

The invention is directed to a bicycle that has an elevated lower frame surface to allow for continuous pedaling of the bicycle in a tight banked turn. At least one transmission with that has an output rotational speed greater than its input rotational speed is provided. The transmissions and rear wheel are carried by an assembly that is pivotally attached to the bicycle frame and easily detached therefrom. A shock absorber is positioned between the frame and rear wheel assembly to dampen vertical movement there between.

7 Claims, 5 Drawing Sheets

BICYCLE WITH TWO CHAIN DRIVEN DIFFERENTIALS

A pedal powered bicycle having a pair of series chain driven transmissions, particularly, a peddle attached sprocket that drives the input of a first transmission through a single or multi speed sprocket assembly and a second transmission driven by the output of the first transmission. The output of the second transmission supplies rotational power to the rear bicycle wheel.

U.S. Pat. No. 1,360,032 issued to E. and J. Schiffner teaches a pedal driven dual series chain drive system. Gearing is achieved by the various sprocket diameters.

U.S. Pat. No. 1,535,714 issued to inventor Lot F. Burke teaches the use of a conventional pedal shaft attached sprocket and a pair of attached sprockets spaced therefrom. The pair of sprockets are driven by a chain between one of the sprockets and the pedal shaft sprocket. The second sprocket of the attached pair drives a rear wheel sprocket. Gearing is achieved by the size ratio of the various sprockets.

U.S. Pat. No. 3,921,467 issued to Hideji Matsuura teaches a chain drive for a bicycle that includes a secondary sprocket to alter the ratios of the drive train.

U.S. Pat. No. 4,826,191 issued to Daniel A. Matre and Jeffrey L. Bleustein teaches a velocipede such as a bicycle or tricycle that includes a drive sprocket mounted on a frame for adjustment between a plurality of positions defining an arcuate path having an axis of curvature. A second sprocket is rotatably mounted on the axis and is coupled to drive sprocket by a first chain. A third sprocket is mounted coaxially with and is coupled to the second sprocket for rotation therewith. A fourth sprocket is mounted on the rear wheel and coupled to the third sprocket by a second drive chain.

U.S. Pat. No. 5,102,155 issued to Ta-Chin Chou teaches a speed changing means mechanism imposed between a driving sprocket and a driven sprocket including a small intermediate sprocket mounted rotatably to the bicycle frame, a first chain entrained on the driving sprocket and the small intermediate sprocket, a large intermediate sprocket connected securely and coaxially to the small intermediate sprocket, a second chain entrained on the large intermediate socket. The sprockets have selected radii.

U.S. Pat. No. 5,873,590 issued to Minoru Abe et al. teaches a pair of transmissions operating in series between the driven sprocket of the pedal crank and the rear wheel of a bicycle.

SUMMARY OF THE INVENTION

This invention is directed to a bicycle that has elevated pedals that can be operable even in a tight turn without contacting the wheel support medium and a pair of series transmissions for driving the rear wheel by pedal rotation.

The bicycle has an elevated central frame relative to the wheels and support surface. By elevating the frame the pedals driving the bicycle are elevated above the bicycle support surface allowing pedaling through tight turns without fear of contacting the bicycle support surface. The pedal crank drives a first sprocket fixedly attached thereto that drives a second sprocket attached to the first transmission via an inter connecting chain. The second sprocket is fixedly attached to one end of a first shaft with the opposite end of the first shaft fixedly attached to a second shaft that is positioned normal to the centerline of the first shaft. The second shaft carries a pair of first gears rotatably positioned on each end thereof.

The first sprocket can be a single sprocket with a selected number of chain engaging teeth or can be a plurality of side by side of ganged together sprockets each of which has a different number of chain engaging teeth with means for selecting any one of the side by side sprockets. The ganged together sprocket assembly is conventional and well known for multiple gearing of bicycles.

A first transmission is driven by a first closed loop chain extending between the first sprocket and a second sprocket associated with the first transmission. The first transmission includes a first housing fixedly attached to the bicycle structure for non rotation, a first ring gear fixedly attached to the housing, a driven shaft driven by the first closed loop chain, a first shaft normal to the driven shaft and fixedly attached to the distal end thereof for rotation therewith, a pair of first pinon gears rotatably attached to the distal ends of the first, shaft. A second ring gear is rotated by the rotation of the pair of first pinion gears. The second ring gear is fixedly attached to an output shaft that drives a third sprocket. The second transmission is constructed and operates the same as the first transmission.

When peddling, the chain between the first sprocket and the second sprocket rotates the first pair of pinion gears which in turn rotate the second ring gear driving the output shaft in the same direction of rotation as the first input shaft at a multiple of the input speed, generally twice the speed, as desired. The output shaft of the first transmission is fixedly attached to a third sprocket that rotates therewith.

The third sprocket is attached through a second chain to a fourth sprocket that drives a second transmission. The second transmission is identical to the first transmission and operates in the same manner producing a output rotation greater than the input speed. Generally, as afore mentioned, twice the input speed is desirable. The output shaft of the second transmission drives the rear wheel of the bicycle at a multiple of the input speed with about four times the input speed of the first transmission being desirable.

The bicycle has a conventional fork assembly with a steerable front wheel rotatably attached thereto. The first and second transmissions and rear wheel are pivotally attached to the frame remote from the front wheel by a pivot pin positioned through apertures in the frame and rear wheels assembly. A shock absorber 30 of the hydraulic type or a spring or a combination of both is inter connected to the pivotal rear portion and the frame thereby providing shock dampening bias between the rear pivotal portion and the frame.

The bicycle generally resembles a conventional two wheeled bicycle.

The principal object of this invention is to provide a bicycle with elevated pedals that can be continually pedaled in a sharp banked turn.

Another object of the invention is to provide a fixed increased RPM in rear wheel speed relative to the pedal speed.

Still another object of the invention is to require less energy from the bicycle operator to achieve any desired speed on flat or inclined surfaces.

Other objects, features, aspects and advantages of the present invention will become apparent from the following detailed description of the present invention when taken in conjunction with the accompanying drawings, in which like reference numerals designate the same or similar parts throughout.

DESCRIPTION OF THE PREFERRED EMBODIMENTS OF THE INVENTION

Figure 1:
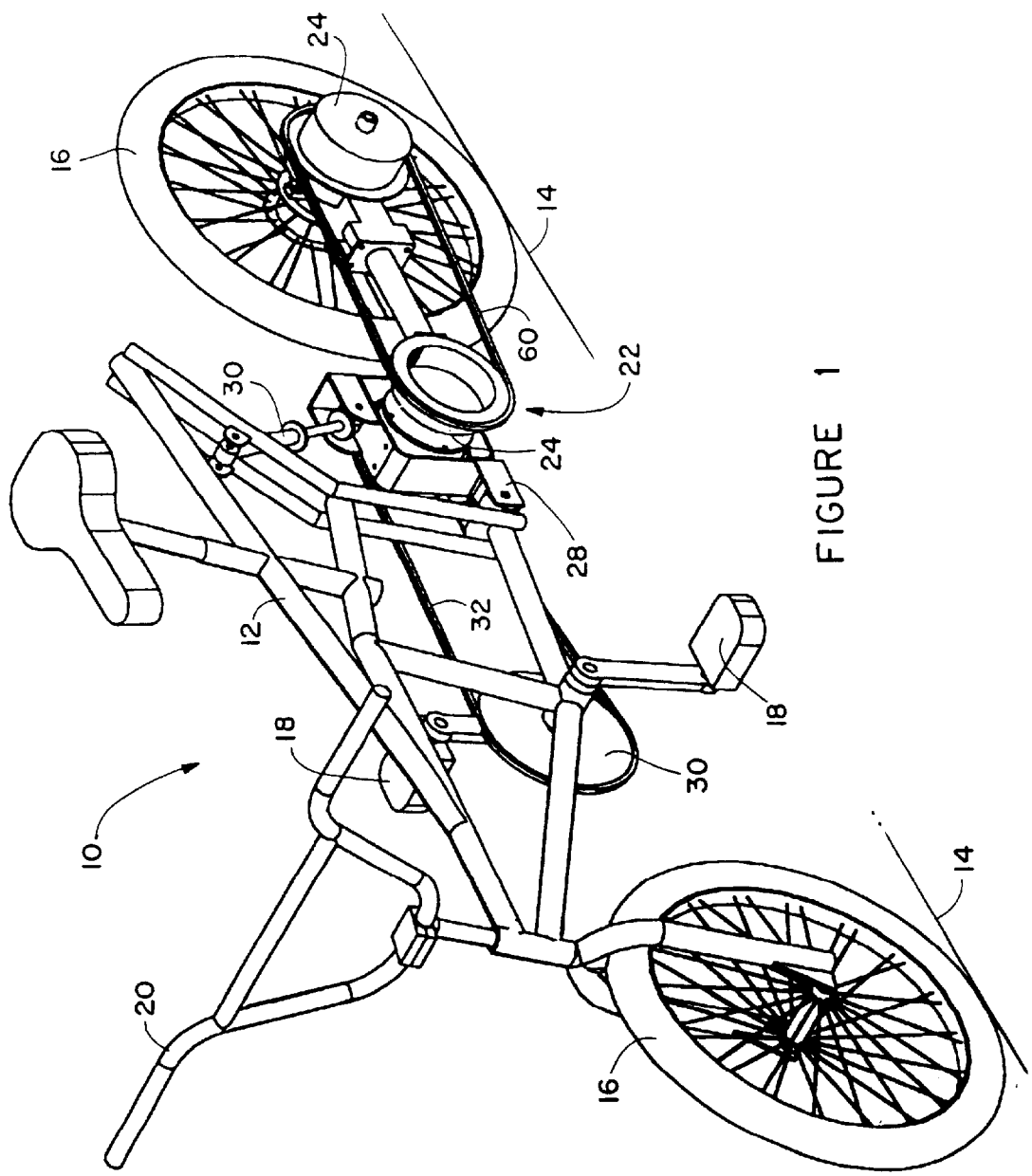
FIG. 1 is a perspective showing of the bicycle of the invention.
Figure 2:
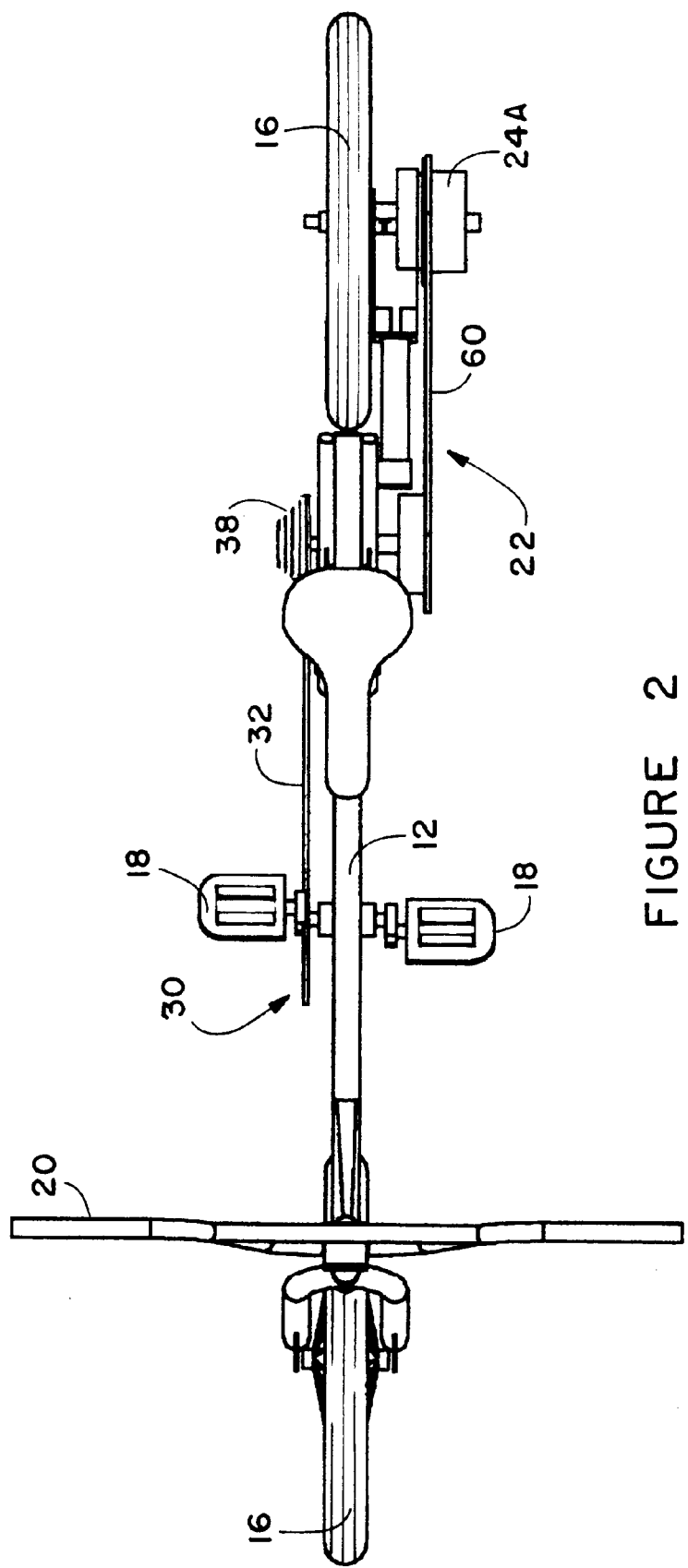
FIG. 2 is a top plan showing of the bicycle of FIG. 1.

Referring now specifically to drawing FIGS. 1 and 2, drawing FIG. 1 depicts the bicycle 10 of the invention. The bicycle includes a frame 12 that has a bottom portion elevated from the support surface 14. The bottom surface elevation services a two fold purpose. Firstly, the wheels 16 can be of a small diameter and secondly the pedals 18 are elevated from the support surface 14 allowing for the pedals to be operated when the bicycle 10 is in a banked turn. Conventional handle bars 20 provide steering of the front wheel 16 in a conventional known and known manner.

The back or rear wheel assembly 22 includes a pair of chain driven transmissions 24 and 24A hereinafter described in detail. The back or rear wheel assembly is pivotally connected to the frame 12 at pivot 28. The pivot is easily removable to disconnect the back or rear wheel assembly from the frame for repair or replacement. The rear wheel assembly is removed by removing a pin (not shown) passing apertures 28, see drawing FIG. 4.

A shock absorber 30 is pivotally connected between the frame 26 and the back or rear wheel assembly to absorb vertical motion of the back or rear wheel assembly relative to the frame. Any selected shock absorption mechanism can be utilized that is satisfactory for this purpose.

Figure 3:
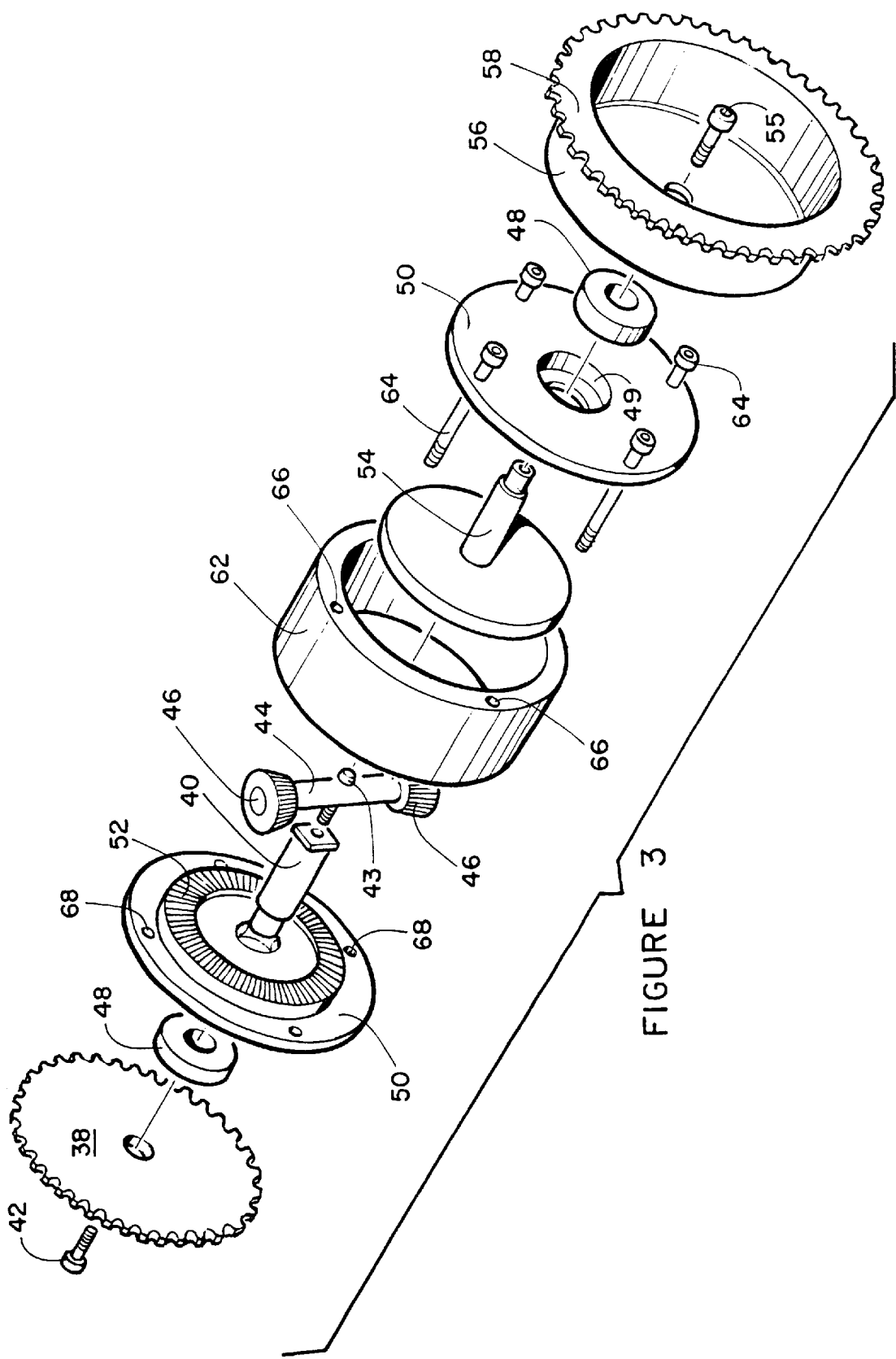
FIG. 3 is an exploded showing of the transmissions of the invention.

Referring now specifically to drawing FIG. 2 and 3, a chain 32 extends between the sprockets 30 and 38. A driving shaft 40 is fixedly attached to sprocket 38 at one end by a bolt or the like 42 and fixedly attached by attachment bolt 43 or the like to a shaft 44 extending normal to the shaft 40 at the opposite distal end thereof. The ends of shaft 40 have pinion gears 46 rotatably fixed thereto.

The shaft 40 rotates with sprocket 38. A bushing 48 is positioned within a recess 49 in the back housing plate 50 of bevel gear 52.

A second bevel gear 52A is fixedly attached to an output shaft 54. The output shaft 54 rotatably passes through housing back plate 50. A bearing 48 supports the shaft 54 passing through back plate 50. The distal end of the shaft 54 is fixedly attached to plate 56 which in turn is fixedly attached to sprocket 58 both of which attached to the distal end of shaft 54 by bolt 55. When in operation, each revolution of sprocket 38 causes sprocket 58 to make two revolutions.

A second transmission 24A drives the back or rear wheel 16. This transmission is the same and operates in the same manner as does the first mentioned transmission 24. The back or rear wheel driving transmission is driven by chain 60 extending between sprockets 58 and 38A.

Like the first described transmission 24 the second transmission 24A produces rotation output speed at twice the input speed.

A single transmission 24A may be employed rather than two in series as shown depending on the rotational speed desired at the back or rear wheel 16. If a single transmission is employed the transmission is be positioned as transmission 24A. With a single transmission a chain extends from sprocket 34 to sprocket 38A.

The transmissions of drawing FIG. 3 are each assembled within housing 62 and held by bolts 64 which extend through apertures 66 in the housing and thread into threaded apertures 68 in back plate 50. Assembled transmissions 24 and 24A as shown in drawing FIGS. 4 and 5.

Figure 4:
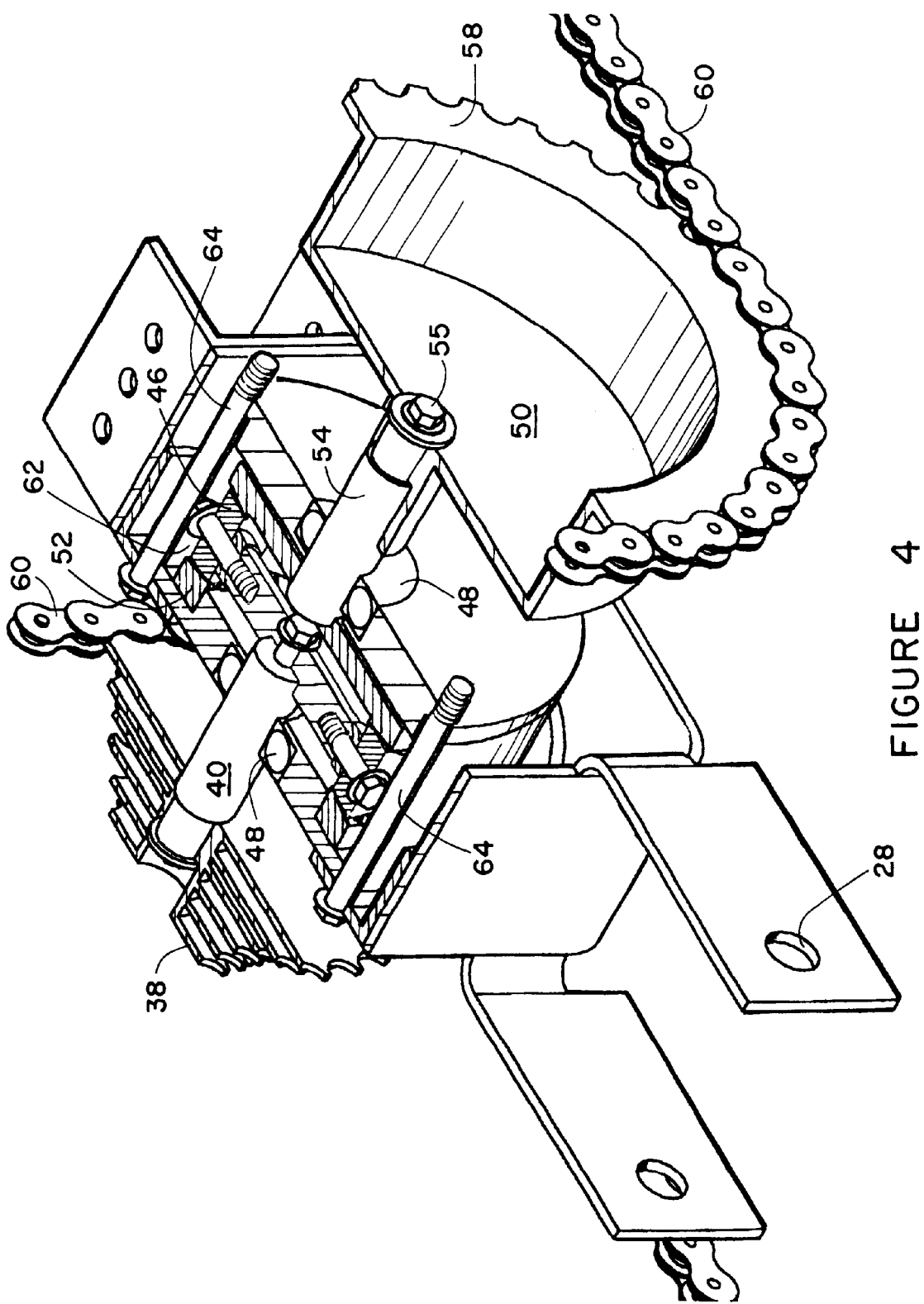
FIG. 4 is a cutaway showing of the driving transmission of the invention.
Figure 5:
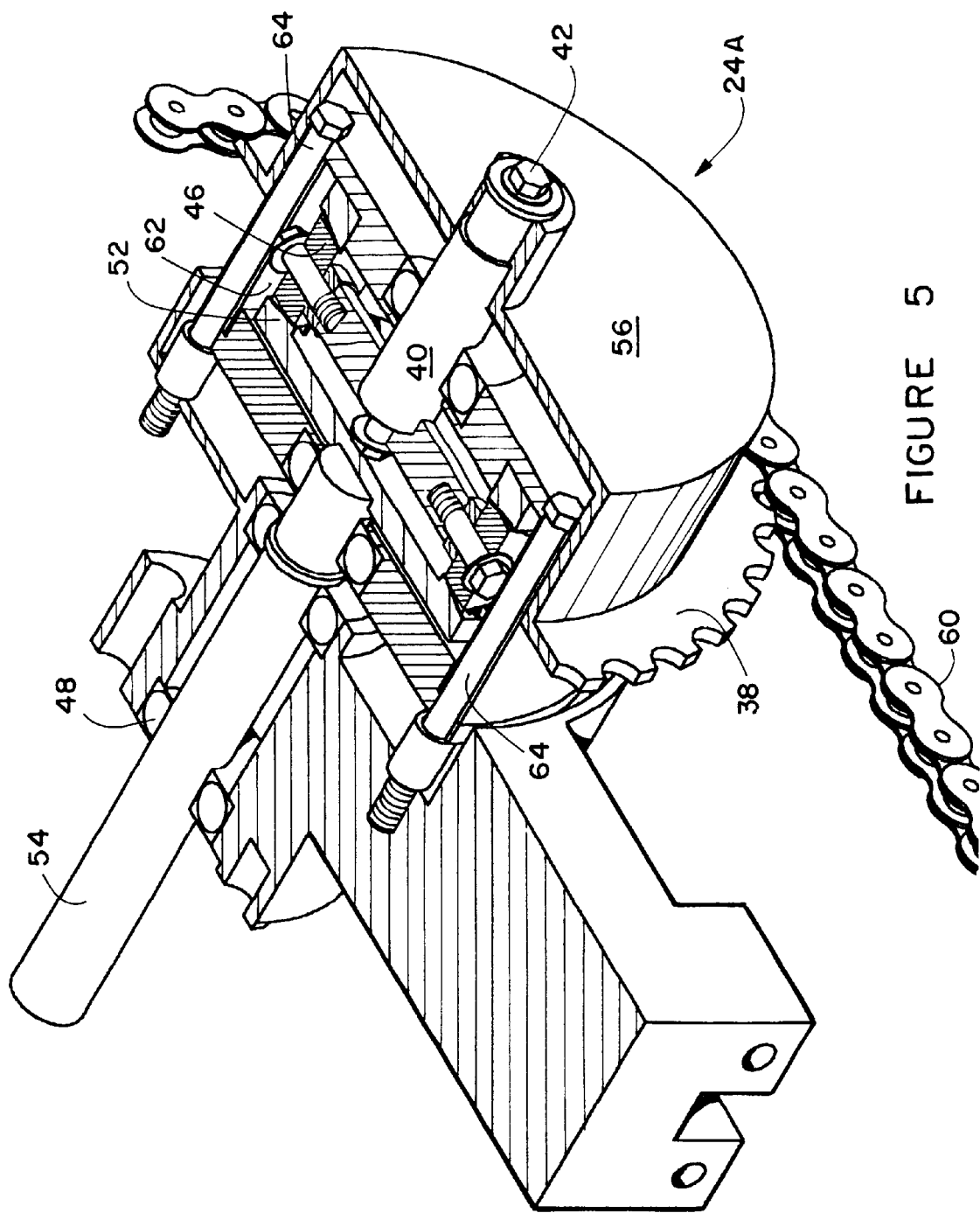
FIG. 5 is a cutaway showing of the driven transmission of the invention.

As aforementioned cut-way drawing FIG. 4 depicts the transmission 24 driven by the pedal sprocket and transmission 24A is driven by the transmission 24.

It should be understood that the transmissions of the invention are not limited to the use with bicycles. Either one or two transmissions in series can be driven by any power source and the output from either one or two transmissions in series can be used to drive any rotational device.

The materials of construction are only limited to those suitable for the purpose intended.

Various details of the invention may be changed without departing from the sprit nor its scope. Furthermore, the foregoing description of the embodiments according to the present invention is provided for the purpose of illustration only, and not for the purpose of limiting the invention as defined by the appended claims and their equivalents.

What is claimed is:

1. A bicycle comprising;

a frame;

a steerable front wheel rotatably attached to said frame;

a first sprocket, said first sprocket carried by said frame and rotatable relative thereto;

a rear wheel assembly comprising a bracket pivotally attached to said frame and a rear wheel rotatably carried by said bracket;

a first transmission mounted on said bracket, said first transmission comprising:

a housing mounted on said bracket a first bevel gear secured within said housing a second sprocket operatively mounted on said bracket for rotation relative thereto;

a chain operatively engaging said first and second sprockets;

a first shaft secured to said second sprocket, extending axially through said second sprocket and rotatable relative thereto;

a transverse bar fixed to said first shaft and bearing at least one pinon gear in engagement with said first bevel gear;

a second bevel gear in engagement with said at least one pinon gear;

a second shaft axially secured at a proximal end to said second bevel gear, rotatable relative to said housing;

a third sprocket secured to a distal end of said second shaft;

means to rotate said rear wheel in response to rotation of said third sprocket.

2. The bicycle according to claim 1, further including a shock absorber positioned between said frame and said back wheel assembly to dampen relative approximately vertical movement.

3. The bicycle according to claim 1, wherein said transmission is sized to provide a rotational speed at said second sprocket about twice the rotational speed of said first sprocket.

4. A bicycle comprising;

a frame;

a steerable front wheel rotatably attached to said frame;

a first sprocket, said first sprocket carried by said frame and rotatable relative thereto;

a rear wheel assembly comprising a bracket pivotally attached to said frame and a rear wheel rotatably carried by said bracket;

a first transmission mounted at a proximal end of said bracket, said first transmission comprising:
a first housing mounted on said bracket
a first bevel gear secured within said housing
a second sprocket operatively mounted on said bracket for rotation relative thereto;
a chain operatively engaging said first and second sprockets;
a first shaft secured to said second sprocket, extending axially through said second sprocket and rotatable relative thereto;
a transverse bar fixed to said first shaft and bearing at least one pinon gear in engagement with said first bevel gear;
a second bevel gear in engagement with said at least one pinon gear;
a second shaft axially secured at a proximal end to said second bevel gear, rotatable relative to said housing;

a second transmission mounted at a distal end of said bracket, said second transmission comprising:
a second housing mounted on said bracket;
a third bevel gear secured within said housing
a third sprocket operatively mounted on said bracket for rotation relative thereto;
a chain operatively engaging said second and third sprockets;
a third shaft secured to said third sprocket, extending axially through said third sprocket and rotatable relative thereto;
a transverse bar fixed to said second shaft and bearing at least one pinon gear in engagement with said third bevel gear;
a fourth bevel gear in engagement with said at least one pinon gear;
a fourth shaft axially secured at a proximal end to said fourth bevel gear, rotatable relative to said housing; and
said third shaft operatively connected to said rear wheel to cause said rear wheel to rotate with said third shaft.

5. The bicycle according to claim 4, further including a shock absorber positioned between said frame and said back wheel assembly to dampen relative approximately vertical movement.

6. The bicycle according to claim 5, wherein said transmission is sized to provide a rotational speed at said second sprocket about twice the rotational speed of said first sprocket.

7. The bicycle according to claim 6, wherein said transmission is sized to provide a rotational speed at said third sprocket about twice the rotational speed of said second sprocket.

\* \* \* \* \*

UNITED STATES PATENT AND TRADEMARK OFFICE
CERTIFICATE OF CORRECTION

PATENT NO. : 6,347,803 B1　　　　　　　　　　　　　　　　　　　　　　　　Page 1 of 1
DATED : February 19, 2002
INVENTOR(S) : Oscar L. Bergez It is certified that error appears in the above-identified patent and that said Letters Patent is hereby corrected as shown below:

<u>Title page,</u>
Please correct spelling of the inventor's name to read as follows:
-- Oscar L. Bergez --

Signed and Sealed this

Twenty-eighth Day of May, 2002

*Attest:*

JAMES E. ROGAN
*Attesting Officer*　　　*Director of the United States Patent and Trademark Office*